Figure 1:
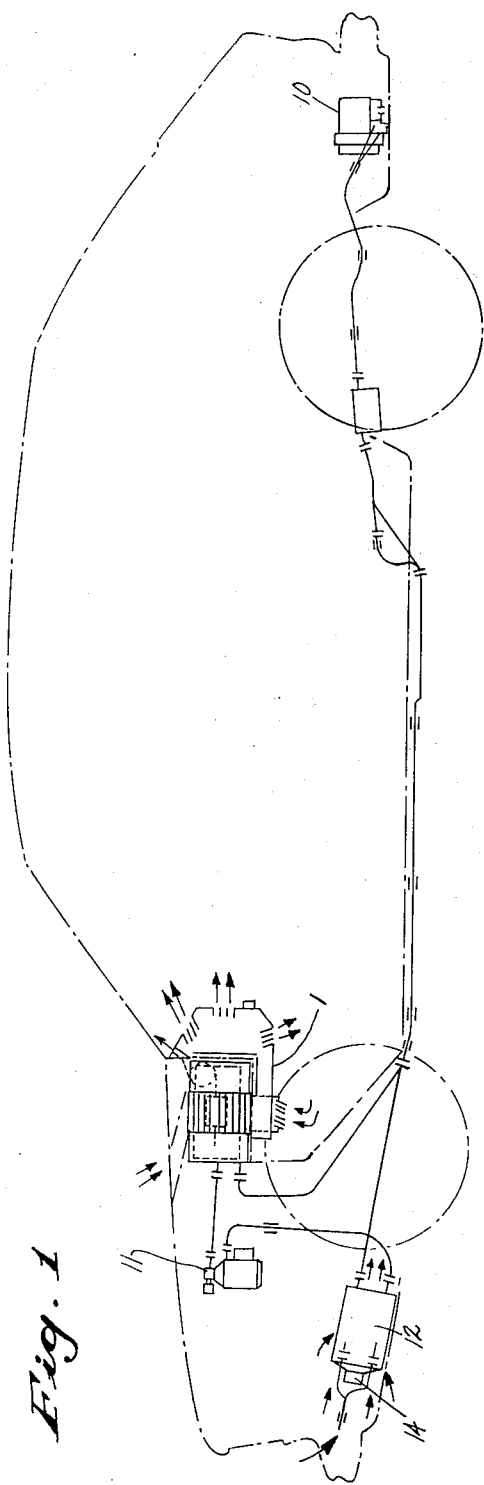

United States Patent [19]
Illg

[11] 3,854,525
[45] Dec. 17, 1974

[54] AIR CONDITIONING PLANT, PARTICULARLY FOR MOTOR VEHICLES

[75] Inventor: Manfred Illg, Aldingen, Germany

[73] Assignee: Firma Suddeutsche Kuhlerfabrik Julius Fr. Behr, Stuttgart-Feuerbach, Germany

[22] Filed: Mar. 7, 1973

[21] Appl. No.: 339,028

Related U.S. Application Data

[63] Continuation-in-part of Ser. No. 18,528, March 11, 1970, abandoned.

[30] Foreign Application Priority Data
Mar. 12, 1969 Germany............................ 1912607

[52] U.S. Cl. ............................................... 165/42
[51] Int. Cl................................................ B60h 3/00
[58] Field of Search ............................. 165/42–44, 165/23, 29

[56] References Cited
UNITED STATES PATENTS

| | | | |
|---|---|---|---|
| 3,139,020 | 1/1964 | Schemenauer.......................... | 165/16 |
| 3,315,730 | 4/1967 | Weaver et al.......................... | 165/23 |

*Primary Examiner*—Charles Sukalo
*Attorney, Agent, or Firm*—Robert H. Jacob

[57] ABSTRACT

Air conditioning plant for motor vehicles comprising a heating plant with a heat exchanger, a cooling plant with a condenser, vaporizer and blower, where the blower is a double radial blower, the blower motor is arranged between the two radial blowers and that the suction chamber between the two blowers can be optionally connected by means of a slidable cover with fresh air and/or a channel for surrounding or ambient air.

4 Claims, 5 Drawing Figures

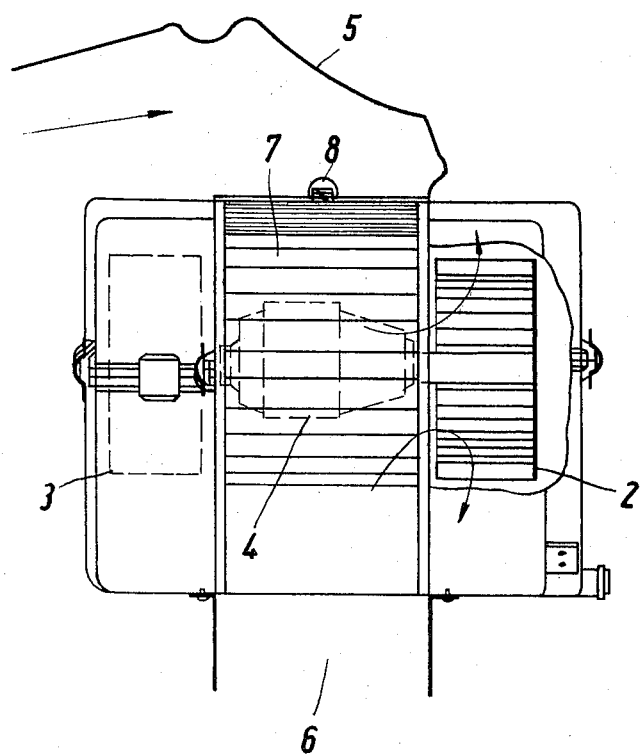

AIR CONDITIONING PLANT, PARTICULARLY FOR MOTOR VEHICLES

The present application is a continuation-in-part of application Ser. No. 18,528 filed Mar. 11, 1970 and now abandoned and corresponding to German application P 19 12 607.9.

The invention is concerned with air conditioning installations and concerns particularly an air conditioning plant, especially for motor vehicles that comprises a heating plant with a heat exchanger, a cool plant with condensers, vaporizer and blower.

Air conditioning plants, particularly so-called integrated air conditioning plants, are known where a heating plant with a heat exchanger, condenser, the cooling plant, blower and the like are constructed as an assembly. In such air conditioning plants with which it is possible to heat and aerate as well as to cool and to dehumidify, shifting baffles are required for shifting from fresh air to ambient air. In known plants shifting baffles or closure flaps or plates of large surface area are required that are of relatively large dimensions.

The invention is based on the problem of providing an air conditioning plant where the shifting from fresh air to ambient air can be undertaken in a simple manner without decreasing the intake cross section by baffles or the like. Particularly for plants in vehicles having narrow space conditions and where all intermediate settings can be adjusted continuously or in a stepless manner.

In accordance with the invention this problem is essentially solved in an air conditioning plant of the type described above that the blower is designed as a double radial blower, that the blower motor is arranged between the two radial blowers and that the intake space disposed between the two blowers can be optionally connected by a slidable cover with a fresh air and/or an ambient air channel.

In this manner it is accomplished that the shifting from fresh air to ambient air or vice versa, as well as any possible intermediate setting can be effected continually without requiring additional space and without operating any additional baffles. Furthermore, in the design in accordance with the invention the take in or suction cross section at the blower or at the fresh air or ambient air channel is not decreased in the fully opened condition.

It is particularly advantageous when the radial blowers are designed as single flued internally drawing radial runners or rotors.

In accordance with a further object of the invention, it is particularly advantageous when the slidable covering is guided along the outer edges of the radial housing. The use of a bendable plastic band is particularly advantageous. Instead of the plastic band other means can also be used, for example, a tightly closing link band or the like.

It is advantageous when the length of this plastic or link band which slides along the outer edges of the two radial housings is so proportioned that in each of the two end positions the ambient air channel or the fresh air channel is completely opened. This is accomplished in that the length of the slidable covering is approximately equal to the distance of the coordinated edges of the ambient air and the fresh air channel. Between these positions it is then also possible to establish any desired mixing relationship between ambient and fresh air.

In accordance with a further feature of the invention the operation can be effected by means of a Bowden wire or a setting motor, electrically, hydraulically or pneumatically.

A further advantage of the invention resides in that the drive motor is particularly advantageously cooled because the entire air quantity with the fresh air as well as with the ambient air operation is drawn out of the space in which the motor is located.

Figure 2:
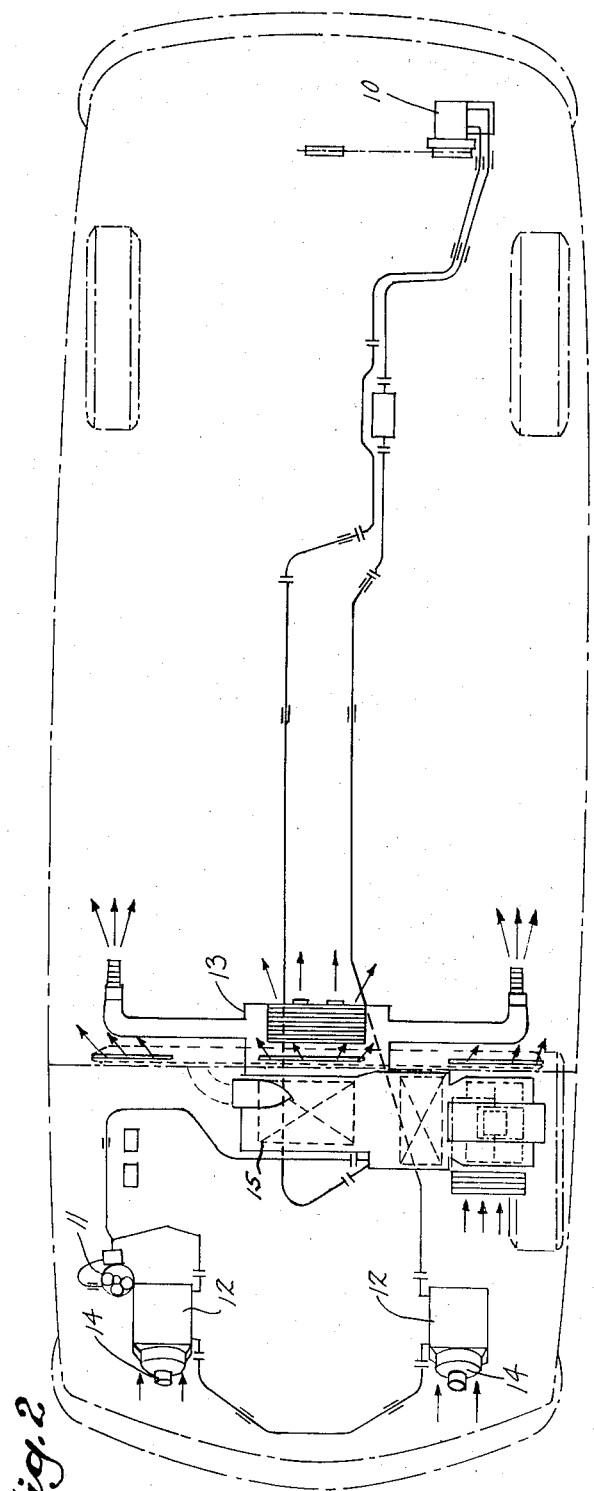
Figure 3:
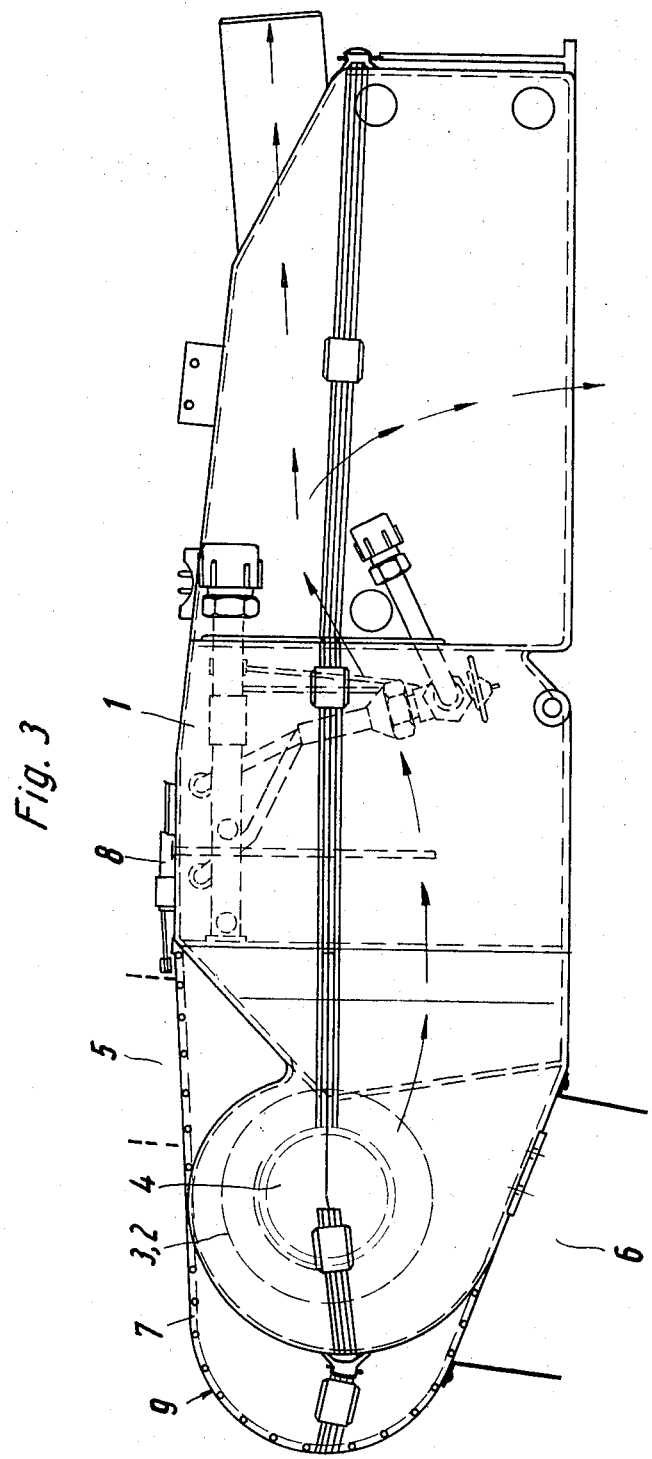
Figure 4:
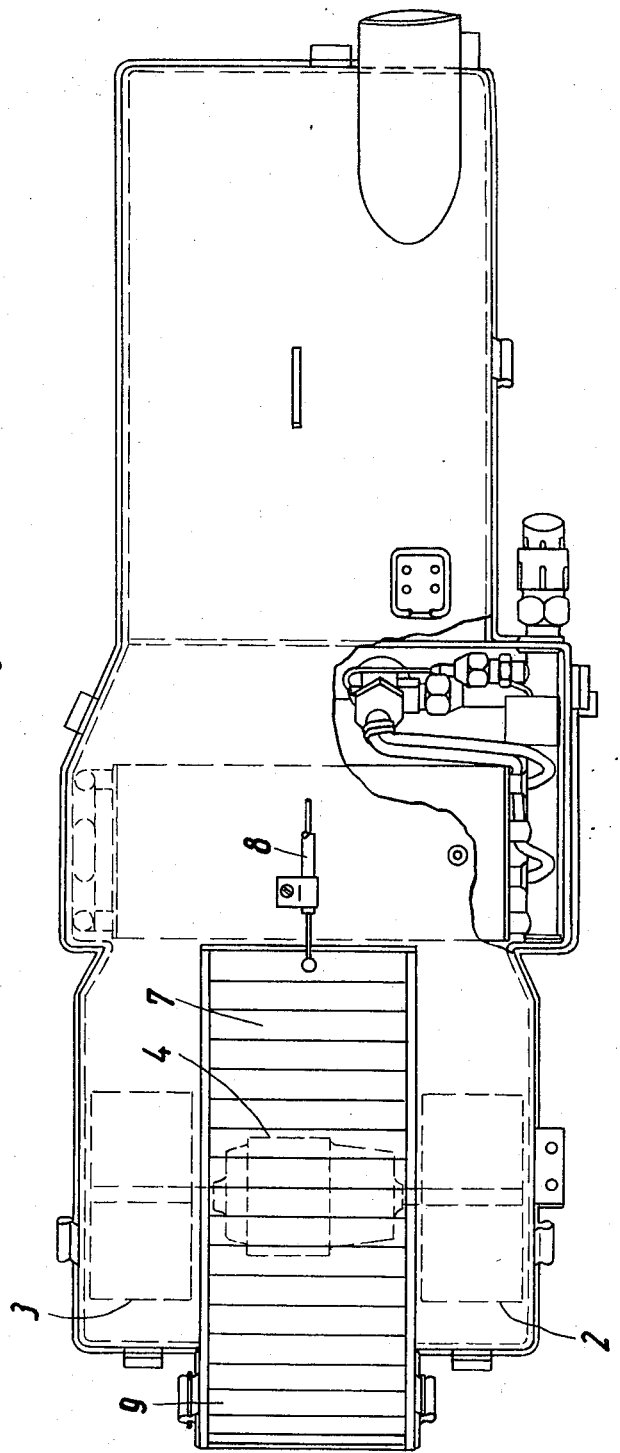

Further features and advantages of the invention are described hereinafter with reference to the drawing which illustrates an embodiment by way of example and in which FIG. 1 is a schematic outline from the side of a vehicle equipped with the air conditioning plant in accordance with the invention, FIG. 2 is a schematic illustration taken from the top of FIG. 1, FIG. 3 is a side view of an air conditioning plant in accordance with the invention, FIG. 4 is a plan view, and FIG. 5 is an end view of the plant in accordance with FIGS. 3 and 4.

The air conditioning plant in accordance with the invention is accommodated in a housing 1 where a drive motor 4 is provided preferably at the front end at the central axis which drives two laterally disposed radial blowers 2 and 3.

The intake or suction space encloses the region of the drive motor and is connected on the one hand with a fresh air channel 5 and on the other hand with an ambient air channel 6 (FIG. 3).

Along the contour of the suction space or chamber 9 a slidable covering 7 is mounted. This slidable covering 7 may be made of bendable or flexible plastic band or, as illustrated in the drawing, of a tightly closing link band in the manner of a venetian blind.

For operating this slidable covering a hand or motor operated Bowden wire 8 is employed. In lieu of the Bowden wire 8 it is also possible to provide an electric, hydraulic or pneumatic setting motor in the housing 1 of the air conditioning plant.

The construction of the displaceable or slidable covering 7 in this connection is such that in the two end positions it completely frees the entire cross section of either the ambient air channel 6 or the fresh air channel 5. By suitable intermediate settings it is possible to obtain a desired or random mixture of fresh air and ambient air.

Ambient air and fresh air may be drawn through channels 5 and 6 blowers 2 and 3. The vaporized refrigerant is supplied to compressor 10 where it is compressed and supplied to the condenser or condensers 12, where it is cooled and liquefied. The condensers include condenser blowers 14. The liquid is then injected by an injection valve into the evaporator 13 while the pressure is released and the liquid is vaporized. A liquid container 11 is disposed between condenser 12 and evaporator 13. The heat for vaporization is absorbed from the surrounding circulating air which is thereby cooled. A heater core is indicated at 15.

The construction in accordance with the invention permits of optimally meeting the requirements regarding the air drawn in. In the heating plant generally only fresh air is utilized because sufficient air is always available in order to satisfactorily warm the fresh air. For the cooling plant it is suitable in order to avoid having the intake of the compressor or the total volume not too great to operate partly or entirely with ambient air which is drawn in out of the interior of the vehicle. In this manner a controllable shifting arrangement is obtained from ambient air to fresh air or divided air in a simple and space spaving manner.

The invention is not limited to the embodiment illustrated and described. It is especially usable also then when for structural reasons the heating plant and air conditioning plant are designed as separate units which however are supplied with suitable air by a common blower.

Consequently the invention encompasses also all modifications conceivable for the man skilled in the art as well as all partial and/or sub-combinations of the described and/or illustrated features.

Having now described my invention with reference to the embodiment illustrated, what I desire to protect by letters patent is set forth in the appended claims.

I claim:

1. In an air conditioning plant for motor vehicles comprising, a housing having an air suction chamber, a heat exchanger, a refrigerating plant having a condenser, an evaporator, a blower motor and blower means, the improvement where said blower means is a double radial blower disposed in a housing, said blower motor is disposed between said radial blowers, said air suction chamber is disposed between said two blowers and a fresh air and an ambient air channel are provided in said housing on opposite sides thereof in proximity to said blower means, a slidable closure movable relative to said fresh air and said ambient air channels, said slidable closure being a flexible band disposed along the outer edges of said suction chamber, and means operative to slide said closure into different positions to admit fresh air, ambient air or a mixture of both.

2. Improvement in air conditioning plant in accordance with claim 1, where the radial blowers are single flue inwardly drawing radial rotors.

3. Improvement in air conditioning plant in accordance with claim 1, where the length of the slidable closure is substantially equal to the distance between the coordinated edges of the ambient air and the fresh air channels.

4. Improvement in air conditioning plant in accordance with claim 1, including a Bowden cable mechanism for displacing the slidable covering.

* * * * *

UNITED STATES PATENT OFFICE
CERTIFICATE OF CORRECTION

Patent No. 3,854,525          Dated December 17, 1974

Inventor(s) Manfred Illg

It is certified that error appears in the above-identified patent and that said Letters Patent are hereby corrected as shown below:

The correct name of the assignee is:

Firma Süddeutsche Kühlerfabrik Julius Fr. Behr.

Signed and sealed this 1st day of July 1975.

(SEAL)
Attest:

RUTH C. MASON
Attesting Officer

C. MARSHALL DANN
Commissioner of Patents
and Trademarks